United States Patent Office

3,065,243
Patented Nov. 20, 1962

3,065,243
REDUCTION OF DICARBOXYLIC ACID ESTERS AND ANHYDRIDES TO GAMMA BUTYROLACTONE
Andrew P. Dunlop, Riverside, Donald G. Manly, Barrington, and Joseph P. O'Halloran, Carpentersville, Ill., assignors to The Quaker Oats Company, Chicago, Ill., a corporation of New Jersey
No Drawing. Filed Oct. 28, 1960, Ser. No. 65,599
9 Claims. (Cl. 260—343.6)

This invention relates to an improved process for producing gamma-butyrolactone from the anhydrides or esters of 1,4-butane dicarboxylic acids or 1,4-butene dicarboxylic acids. More specifically it relates to a process for producing gamma-butyrolactone by treating the anhydrides or esters of 1,4-butane dicarboxylic acids or 1,4-butene dicarboxylic acids in the vapor phase with gaseous hydrogen in contact with a catalyst.

Gamma-butyrolactone is a known compound which finds use as a dye solvent, as a spinning solvent for synthetic fibers, and as an intermediate for the manufacture of pyrrolidone. This compound has been produced by the high pressure hydrogenation of maleic anhydride in the presence of a nickel or cobalt molybdite catalyst. This prior art process gives poor yields of the butyrolactone. Moreover, since the reaction requires high pressure, expensive equipment must be employed.

One of the objects of this invention is to produce gamma-butyrolactone in high yields.

Another object of this invention is to provide a process for producing gamma-butyrolactone whereby high pressures are not necessary.

An additional object of this invention is to provide a process readily adaptable to continuous operation in which incompletely hydrogenated intermediates may readily be recycled for complete conversion to the desired end product.

A further object of this invention is to provide a process for producing gamma-butyrolactone that employs relatively inexpensive materials and equipment.

A still further object of the invention is to provide a process for making gamma-butyrolactone which makes possible the use of the same catalyst over a long period without regeneration.

Further and additional objects will appear from the following description and the accompanying claims.

In accordance with a preferred embodiment of this invention the foregoing objects are accomplished by contacting a feed compound selected from the group consisting of maleic anhydride, succinic anhydride, esters of succinic, maleic and fumaric acids, or mixtures of same in the vapor phase with hydrogen at an elevated temperature in the presence of a copper chromite catalyst. In converting the specified anhydride or ester to gamma-butyrolactone according to this invention, the temperature employed is between about 100° C. and about 400° C. and preferably between about 150° C. and about 375° C. Hydrogen is supplied to the reaction zone in a stoichiometric excess, preferably in such a quantity that the molar ratio of hydrogen to the anhydride or ester is in excess of 10:1 and as high as 200:1 or even higher. The reactants are passed to the catalytic reaction zone in the vapor phase and the reaction is carried out at low pressures which may range from subatmospheric up to about five atmospheres. Preferably the pressure is between about one and about three atmospheres.

The anhydrides that can be used in this invention are either maleic or succinic anhydride. Under certain conditions maleic or succinic acids may be the initial feed compound to the process in which event they are to be dehydrated at elevated temperatures to the corresponding anhydrides before or upon contact with the copper chromite in the presence of hydrogen. In addition, the esters of succinic, maleic or fumaric acid can be used as the feed compound. Such esters include dimethyl succinate, diethyl maleate, diethyl succinate, diethyl fumarate, dipropyl succinate, dipropyl fumarate or dibutyl succinate. The alcohol component of the ester employed is preferably an aliphatic alcohol having 1 to 6 carbon atoms and most preferably 1 to 4 carbon atoms. When maleic or succinic anhydride is employed as the starting material it is either vaporized as such or from a solution containing it and an organic solvent, such as butyrolactone, valerolactone or an aliphatic alcohol, such as methanol, ethanol, propanol or butanol. For economical reasons when a solvent is used it is preferred to employ only the minimum amount of solvent required to dissolve the anhydride.

The catalyst employed in the process of this invention is reduced copper oxide-chromium oxide (also frequently referred to as copper chromite) in which the ratio by weight of copper oxide (CuO) to chromium oxide ($Cr_2O_3$) prior to reduction, is less than 10:1 and more than 1:1 but preferably less than 5:1 and more than 1.25:1. These catalysts are well known to the art and are described by Homer Adkins in the book "Reactions of Hydrogen With Organic Compounds Over Chromium Oxide and Nickel Catalysts," University of Wisconsin Press, 1944, pages 12 to 14. The catalyst may be in the form of pellets, pellet particles, or may be deposited on a carrier as is well known. It is preferable that the catalyst be reduced with hydrogen at a temperature below about 350° C. prior to use in the process of this invention.

When the feed compound of this invention is maleic anhydride or an ester of fumaric or maleic acid, it is believed that the double bond is first and readily hydrogenated to produce the corresponding succinic compound, i.e. either the ester or the anhydride. In carrying out the hydrogenation in accordance with the invention, it is preferred to employ reaction conditions, e.g. feed rate and temperature, such that less than all of the feed compound is converted to the desired end product (i.e., gamma-butyrolactone), the balance remaining in the reacted mixture as a succinic compound (i.e., a succinic ester or succinic anhydride). The desired gamma-butyrolactone and the succinic compound are separated from the reaction products by distillation and the succinic compound is recycled to the system for further hydrogenation. The weight ratio of gamma-butyrolactone to succinic compound in the condensate from a single pass through the reaction zone is preferably between about 100 to 1 and about 2 to 1 and most preferably between about 50 to 1 and about 3 to 1. If the butyrolactone to succinic compounds weight ratio becomes too low, then by-products are formed which cannot be reprocessed to butyrolactone and therefore over-all yields are impaired.

A preferred procedure for the prior reduction of the catalyst is as follows: Copper chromite, preferably having a copper to chromium ratio within the aforedescribed limits, is heated to about 140° C. under a nitrogen or other inert atmosphere. Hydrogen is slowly added to the system at such a rate as to avoid the buildup of temperatures above 250° C. within the catalyst bed. The gas flowing over the catalyst bed is gradually enriched with hydrogen as the temperature is slowly raised to 200° C. At this temperature the gas should be pure hydrogen. It is held at this temperature until no further formation of water of reduction is observed. The catalyst is then ready for use in the process of this invention.

The invention will be further illustrated but is not limited by the following examples in which the quantities of reactants are in parts by weight unless otherwise indicated. Feed rate, where given in the examples, is in parts of the anhydride or ester per hour per part of catalyst. The temperature of the catalyst bed in each example is the highest temperature observed in the catalyst bed. In all examples the over-all material balance was substantially quantitative. In the following examples no maleic anhydride or its esters were observed in the several products.

*Example 1*

Copper chromite pellets having the designation "Cu-0203–T1/8" obtained from Harshaw Chemical Company and having a ratio by weight of $CuO:Cr_2O_3$ of 80:20 were reduced according to the following procedure: About 3500 parts of the pellets were charged to a jacketed, steel reactor tube included in a hermetically-joined system comprising a recycle compressor, flowmeter, preheater, reactor tube, condenser and product tank. The entire system was thoroughly flushed with nitrogen to purge it of any oxygen. The system was then pressurized with nitrogen and valves adjusted to obtain a flow of about 1500 parts of the gas per minute with compressor intake discharge pressure of about 4 and 8 pounds per square inch, respectively. The preheater was adjusted to obtain a gas temperature of about 170° C. in the catalyst charge (catalyst bed). Hydrogen was then fed into the circulating nitrogen stream at a rate of about 50 parts per minute. After about 428 parts of water had condensed and collected in the product tank, the system was thoroughly flushed with hydrogen to purge the system of nitrogen. The temperature of the hydrogen gas flowing through the catalyst bed was then gradually raised to about 225° C. over a period of about one hour and held at that temperature for an additional hour. An additional 2.3 parts of water were condensed and collected.

After reduction of the catalyst as described above, 65 parts of maleic anhydride were mixed into 35 parts of butyrolactone. The resulting solution along with hydrogen gas was fed to a vaporizer. The molar ratio of hydrogen to maleic anhydride was maintained at 50:1. The gases produced by this vaporization were then passed through the reduced above-mentioned catalyst bed which was maintained at a temperature of 330° C. The feed rate was 0.182. The resulting product vapors were condensed to give a mixed condensate comprising succinic anhydride, gamma-butyrolactone and water. The condensate obtained was fractionally distilled, and it was found that 20.7 parts (20.3% theoretical conversion) succinic anhydride and 62.9 parts (71.8% theoretical conversion) of gamma-butyrolactone were formed per 100 parts of maleic anhydride fed. The gamma-butyrolactone was withdrawn as the product and the succinic anhydride was recycled to the feed system and thereby became completely converted.

After the catalyst had been used under the above conditions for a period of 455 hours, substantially the same conversions and yields were obtained and at the end of this period there was no indication of any catalyst inactivation.

*Example 2*

The procedure of Example 1 was repeated with the following exceptions: (1) the feed rate was 0.090, (2) the temperature of the catalyst bed was 289° C., and (3) the molar ratio of hydrogen to maleic anhydride was 70:1. The product showed a 17.8% theoretical conversion to succinic anhydride and a 73.3% theoretical conversion to gamma-butyrolactone.

*Example 3*

The procedure of Example 1 was repeated with the following exceptions: (1) the feed rate was 0.014, (2) the temperature was 245° C., and (3) the molar ratio of hydrogen to maleic anhydride was 70:1. The product showed a 3.3% theoretical conversion to succinic anhydride and a 94.6% theoretical conversion to gamma-butyrolactone.

*Example 4*

The procedure of Example 1 was repeated with the following exceptions: (1) the maleic anhydride was vaporized as such without any solvent such as butyrolactone, (2) the feed rate was 0.21, (3) the temperature was 320° C., and (4) the molar ratio of hydrogen to maleic anhydride was 70:1. The product showed a 17.2% theoretical conversion to succinic anhydride and a 79.8% theoretical conversion to gamma-butyrolactone.

*Example 5*

Diethyl maleate and hydrogen were fed over the reduced catalyst prepared in the manner specified in Example 1. The feed rate was 0.073, the temperature was 310° C., and the molar ratio of hydrogen to diethyl maleate was 50:1. No diethyl succinate was found in the product. A 96.9% theoretical conversion to gamma-butyrolactone was obtained.

*Example 6*

Succinic anhydride and hydrogen were fed over the reduced catalyst prepared in the manner specified in Example 1. The feed rate was 0.090, the temperature was 298° C., and the molar ratio of hydrogen to succinic anhydride was 100:1. The product showed an 11.4% recovery of succinic anhydride and an 88.1% theoretical conversion to gamma-butyrolactone.

*Example 7*

Eighty parts of maleic anhydride were mixed with twenty parts succinic anhydride. The resulting mixture along with hydrogen gas was fed to the vaporizer and over the same reduced catalyst. The feed rate was 0.18, the molar ratio of hydrogen to the two anhydrides was 70:1, and the temperature was 314° C. The product showed a 21.7% theoretical conversion of the maleic anhydride to succinic anhydride and a 78.3% theoretical over-all conversion to gamma-butyrolactone.

*Example 8*

Diethyl fumarate and hydrogen were fed over the same reduced catalyst. The feed rate was 0.0298, the molar ratio of hydrogen to diethyl fumarate was 60:1, and the temperature was 202° C. Neither diethyl fumarate nor diethyl succinate was found in the product. A 73.5% theoretical conversion to gamma-butyrolactone was obtained.

*Example 9*

Fifty-seven parts of maleic anhydride were mixed into 43 parts of butanol. The resulting solution along with hydrogen gas was fed to vaporizer and over the same reduced catalyst. The feed rate was 0.093, the molar ratio of hydrogen to maleic anhydride was 50:1, and the temperature was 301° C. The product showed a 17.6% theoretical conversion to succinic anhydride and a 79.9% theoretical conversion to gamma-butyrolactone.

*Example 10*

Dipropyl succinate and hydrogen were fed over the same reduced catalyst. The feed rate was 0.038, the molar ratio of hydrogen to dipropyl succinate was 75:1, and the temperature was 205° C. No dipropyl succinate was found in the product. A 70.5% theoretical conversion to gamma-butyrolactone was obtained.

*Example 11*

The procedure of Example 1 was repeated with the following exceptions: (1) the ratio CuO to $Cr_2O_3$ in the catalyst prior to reduction was 54:37, (2) the feed rate was 0.272, and (3) the molar ratio of hydrogen to maleic anhydride was 25:1. The product showed a 25.6% theoretical conversion to succinic anhydride and a 60.2% theoretical conversion to gamma-butyrolactone.

An examination of the conversion figures given shows that very high yields are obtained, e.g., in Example 4 the percent of maleic anhydride converted to succinic anhydride and butyrolactone is 17.2+79.8=97.0%. Of course, as indicated by Examples 6 and 7, succinic anhydride which is produced in Example 4 from maleic anhydride may be recycled to give better than 99% over-all conversion to gamma-butyrolactone.

From the examples it is apparent that the invention advances the art of producing gamma-butyrolactone to a considerable degree. The catalyst may be employed over an unusually long period of time without regeneration or replacement; the yield of gamma-butyrolactone is substantially quantitative; and of further importance, the reaction takes place at substantially atmospheric pressure so that expensive high pressure equipment need not be employed.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A process for producing gamma-butyrolactone which comprises contacting a feed compound selected from the group consisting of maleic anhydride, succinic anhydride, and esters of maleic, succinic and fumaric acid, in vapor phase, with hydrogen at a pressure of less than 5 atmospheres and at a temperature between about 100° C. and about 400° C. in the presence of a copper chromite catalyst.

2. A process for producing gamma-butyrolactone which comprises contacting a feed compound selected from the group consisting of maleic anhydride, succinic anhydride, and esters of maleic, succinic and fumaric acid, in vapor phase, with hydrogen at a pressure of less than 5 atmospheres and at a temperature between about 100° C. and about 400° C. in the presence of a reduced copper chromite catalyst, said catalyst having been reduced with a hydrogen-containing gas at a temperature below about 350° C. and having a ratio by weight of $CuO:Cr_2O_3$ prior to reduction of less than 10:1 and more than 1:1.

3. The process according to claim 2 in which the molar ratio of hydrogen to said feed compound is in excess of about 10:1.

4. A process for producing gamma-butyrolactone which comprises vaporizing a solution of maleic anhydride in an organic solvent and contacting the resulting vapors and hydrogen at a pressure of less than 5 atmospheres and at a temperature between about 100° C. and about 400° C. with a reduced copper chromite catalyst.

5. The process according to claim 2 in which the feed compound is contacted with hydrogen at a temperature between about 150° C. and about 375° C.

6. A process for producing gamma-butyrolactone which comprises contacting diethyl maleate in vapor phase with hydrogen at a pressure of less than 5 atmospheres and at a temperature between about 100° C. and about 400° C. in the presence of a reduced copper chromite catalyst, said catalyst having been reduced at a temperature below about 350° C. and having a ratio by weight of $CuO:Cr_2O_3$ prior to reduction of less than 10:1 and more than 1:1.

7. A process for producing gamma-butyrolactone which comprises contacting diethyl fumarate in vapor phase with hydrogen at a pressure of less than 5 atmospheres and at a temperature between about 100° C. and about 400° C. in the presence of a reduced copper chromite catalyst, said catalyst having been reduced at a temperature below about 350° C. and having a ratio by weight of $CuO:Cr_2O_3$ prior to reduction of less than 10:1 and more than 1:1.

8. A process for producing gamma-butyrolactone which comprises vaporizing a solution of maleic anhydride in an organic solvent selected from the group consisting of butyrolactone, valerolactone, methanol, ethanol, propanol and butanol and contacting the resulting vapors and hydrogen at a pressure of less than 5 atmospheres and at a temperature between about 150° C. and about 375° C. with a reduced copper chromite catalyst, said catalyst having been reduced with hydrogen at a temperature below about 350° C. and having a ratio by weight of $CuO:Cr_2O_3$ prior to reduction of between about 10:1 and about 1:1, fractionally condensing the resulting product vapors to give separate condensates, one of which comprises succinic anhydride and the other of which comprises gamma-butyrolactone, and contacting the first mentioned condensate with said catalyst.

9. A process for producing gamma-butyrolactone which comprises contacting a feed compound of the group consisting of maleic anhydride, succinic anhydride, and esters of maleic, succinic and fumaric acid, in vapor phase, with hydrogen at a pressure of less than 5 atmospheres and at a temperature between about 150° C. and about 375° C. in the presence of a reduced copper chromite catalyst, said catalyst having been reduced at a temperature below about 350° C. and having a ratio by weight of $CuO:Cr_2O_3$ prior to reduction of between about 10:1 and about 1:1, condensing the resulting product vapors and separating a succinic compound selected from the group consisting of succinic anhydride and a succinic ester from gamma-butyrolactone, and recycling said succinic compound to contact with said catalyst.

References Cited in the file of this patent

UNITED STATES PATENTS

| 2,072,861 | Amend et al. | Mar. 9, 1937 |
| 2,772,293 | Gilbert et al. | Nov. 27, 1956 |
| 2,786,852 | Dunlop et al. | Mar. 26, 1957 |

OTHER REFERENCES

Wagner et al.: Synthetic Organic Chem., Wiley, New York (1953), pages 533, 535, and 536.